United States Patent [19]

Gheri

[11] Patent Number: 4,495,146
[45] Date of Patent: Jan. 22, 1985

[54] SPHERICAL NUCLEAR FUEL LOADING SYSTEM

[75] Inventor: Aime A. Gheri, Richland, Wash.

[73] Assignee: Exxon Nuclear Company, Inc., Bellevue, Wash.

[21] Appl. No.: 327,817

[22] Filed: Dec. 7, 1981

[51] Int. Cl.³ .................... G21C 5/36; B67D 5/08; G21G 17/04; G21G 13/00

[52] U.S. Cl. .................... 376/261; 376/265; 222/77; 141/12; 141/71

[58] Field of Search ............ 376/265, 381, 261, 382, 376/419, 430, 428; 141/1, 12, 71, 73, 374, 392; 222/77; 29/200 N

[56] References Cited

U.S. PATENT DOCUMENTS

| | | | |
|---|---|---|---|
| 2,337,304 | 12/1943 | Ashton | 141/71 |
| 2,983,658 | 5/1961 | Hyman | 376/265 |
| 3,253,738 | 5/1966 | Bromley | 376/265 |
| 3,261,378 | 7/1966 | Ayer et al. | 141/12 |
| 3,778,348 | 12/1973 | Sease et al. | 376/428 |
| 3,828,518 | 8/1974 | Silk et al. | 29/400 N |
| 3,838,716 | 10/1974 | Ripple | 141/374 |
| 3,947,320 | 3/1976 | Zinn | 376/451 |
| 4,111,335 | 9/1978 | Arya et al. | 222/77 |
| 4,163,464 | 8/1979 | Velling et al. | 141/392 |
| 4,312,704 | 1/1982 | Schror et al. | 376/265 |

FOREIGN PATENT DOCUMENTS

| | | | |
|---|---|---|---|
| 2357426 | 7/1975 | Fed. Rep. of Germany | 376/265 |
| 54-58192 | 10/1977 | Japan | 29/400 N |

Primary Examiner—Sal Cangialosi
Attorney, Agent, or Firm—Ronald D. Hantman

[57] ABSTRACT

A system and method for the loading of spherical nuclear fuel in vertical fuel rods. The system includes a fuel rod support, a glovebox, a weighing station system, a means for feeding spherical fuel to the fuel rod and transportation means for moving the fuel between parts of the system.

9 Claims, 10 Drawing Figures

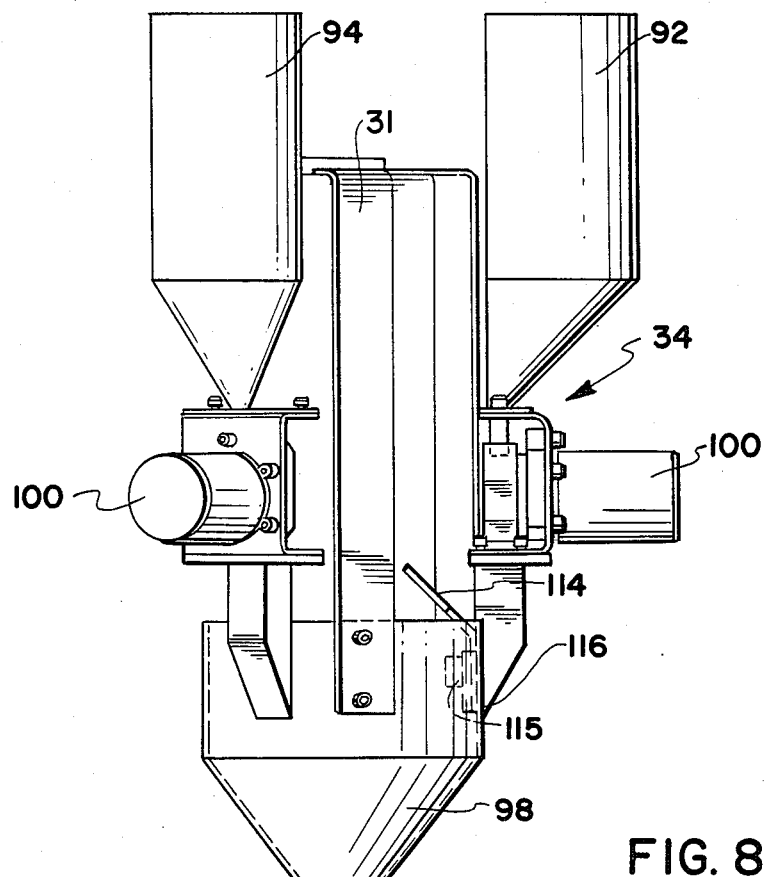
FIG. 8
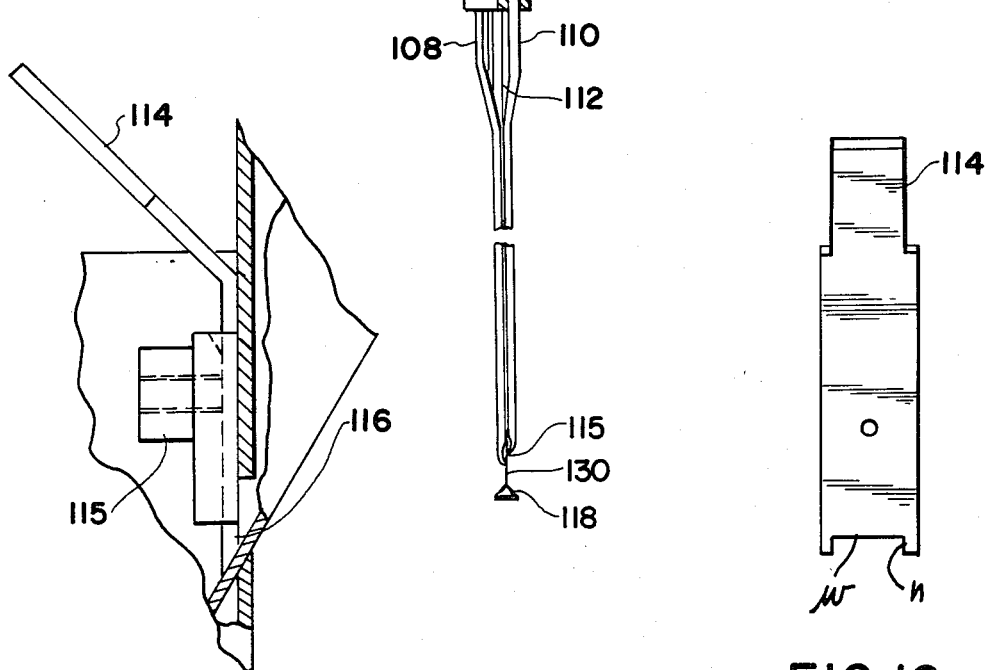
FIG. 9
FIG. 10

SPHERICAL NUCLEAR FUEL LOADING SYSTEM

BACKGROUND OF THE INVENTION

The present invention relates to the loading of fuel rods with spherical nuclear fuel.

In recent years it has been discovered that conventional nuclear reaction fuel composed of fuel pellets encased in cladding tubes may lead to the splitting of the cladding tubes thereby releasing radioactive material to the adjacent cooling water. This splitting is due to an interaction between the pellet and cladding. One way of avoiding this problem is to limit the surface interaction between the fuel and cladding. This may be achieved by loading the fuel cladding tubes with nuclear fuel in the shape of spheres. If three different sizes of spheres are used, then appropriate packing of the spheres into the rods will result in a sufficient density of nuclear fuel to be properly used in a nuclear reactor.

One method for loading a fuel rod is to simply drop the spheres into a vertical cladding tube while vibrating the rod to assist in packing. However, this method is not satisfactory for several reasons. The distribution of the particles sizes freely falling from a height of 6 to 12 feet into a cladding tube does not lead to uniform distribution. This method also leads to the trapping of air which requires a longer time to evacuate at the sealing of the tube. In addition, the vibrating packing is extended because of the random loading of the spheres.

SUMMARY OF THE INVENTION

The invention is a system and method for the loading of spherical nuclear fuel into a fuel rod. The system includes a main housing having an inert atmosphere and having an opening to receive fuel spheres having three different diameters for loading into fuel rods; a weighing station system for receiving the spheres and separating the spheres into three predetermined quantities, the weighing system including a balance means for weighing the nuclear fuel spheres; a means for transferring the fuel spheres after entering the housing to the weighing station within the housing; a fuel rod support system for supporting the fuel rod in an upright position; a feeding probe for loading the predetermined quantities of the fuel spheres in a controlled manner into the fuel rod; and a means for transferring each of the predetermined quantity of the fuel spheres to a corresponding hopper of the feeding probe for subsequent loading into the fuel rod.

In addition, a method if disclosed for loading a nuclear fuel rod with spherical nuclear fuel. The method includes the steps of transferring nuclear fuel spheres having three different diameters into a glove box having an inert atmosphere; transferring the fuel spheres to weighing stations, a different weighing station corresponding to each diameter of the nuclear fuel spheres; weighing out a predetermined quantity of fuel spheres for each diameter; transferring the fuel spheres to hoppers on a fuel probe, one hopper corresponding to each of the diameters of the nuclear fuel sphere; lowering the fuel probe into the fuel rod so that the lower end of the probe is just above the bottom of the fuel rod; discharging the nuclear fuel spheres from the fuel probe discharge tube opening at a controlled rate into the fuel rod; and removing the fuel probe from the fuel rod at a rate such that the lower end of the fuel probe remains just above the top of the ascending fuel column.

BRIEF DESCRIPTION OF THE DRAWINGS

FIG. 8 shows an elevated view of the feeding probe.

FIG. 9 shows a cross-sectional view of the regulator gate arrangement of the feeding probe.

FIG. 10 shows the regulator gate.

DESCRIPTION OF THE PREFERRED EMBODIMENT

Figures 1, 2:
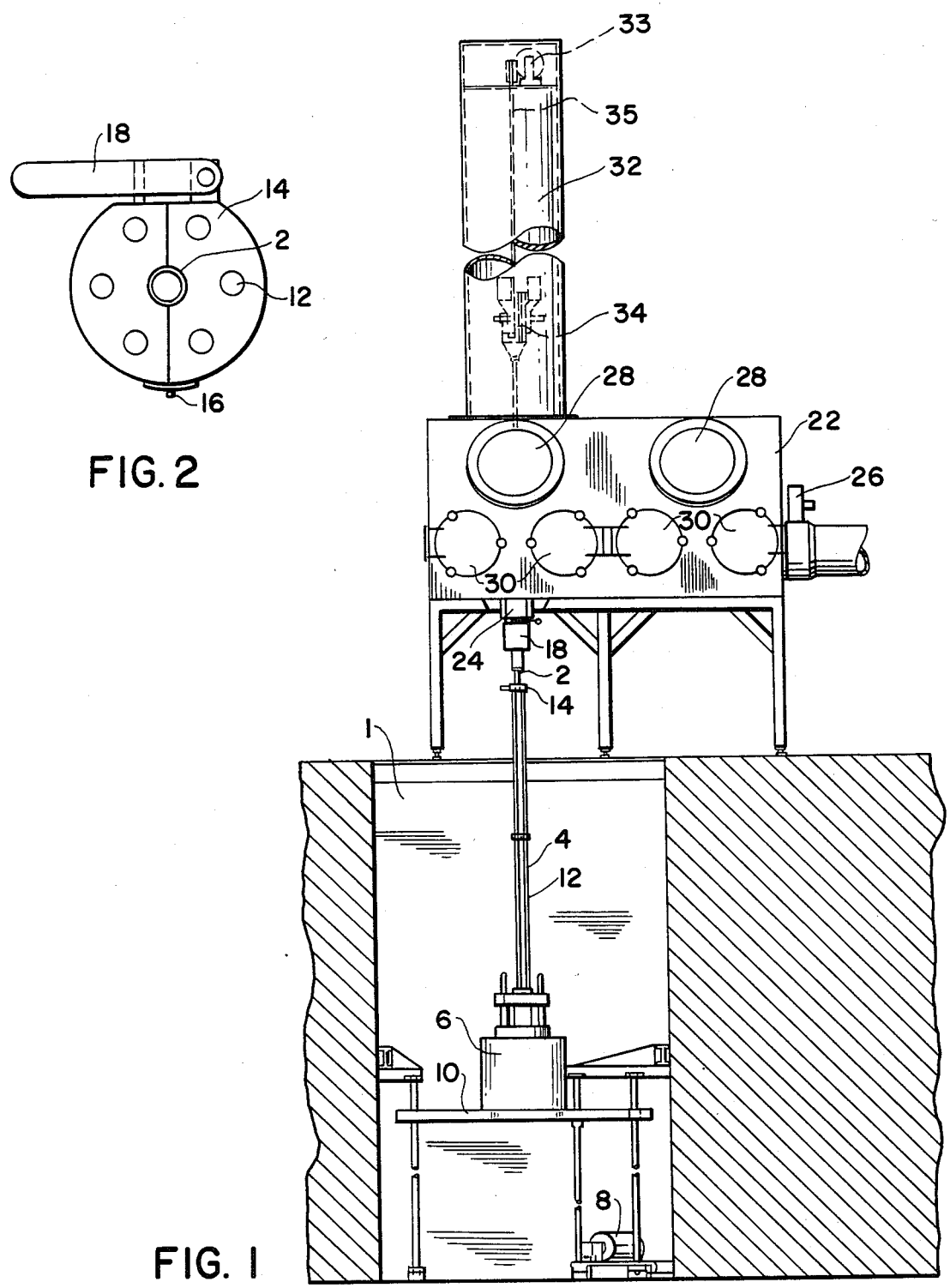
FIG. 1 shows an elevated view of the system viewed from the front.
FIG. 2 shows a cross-section of the support clamp used to hold the fuel rod erect.
Figure 3:
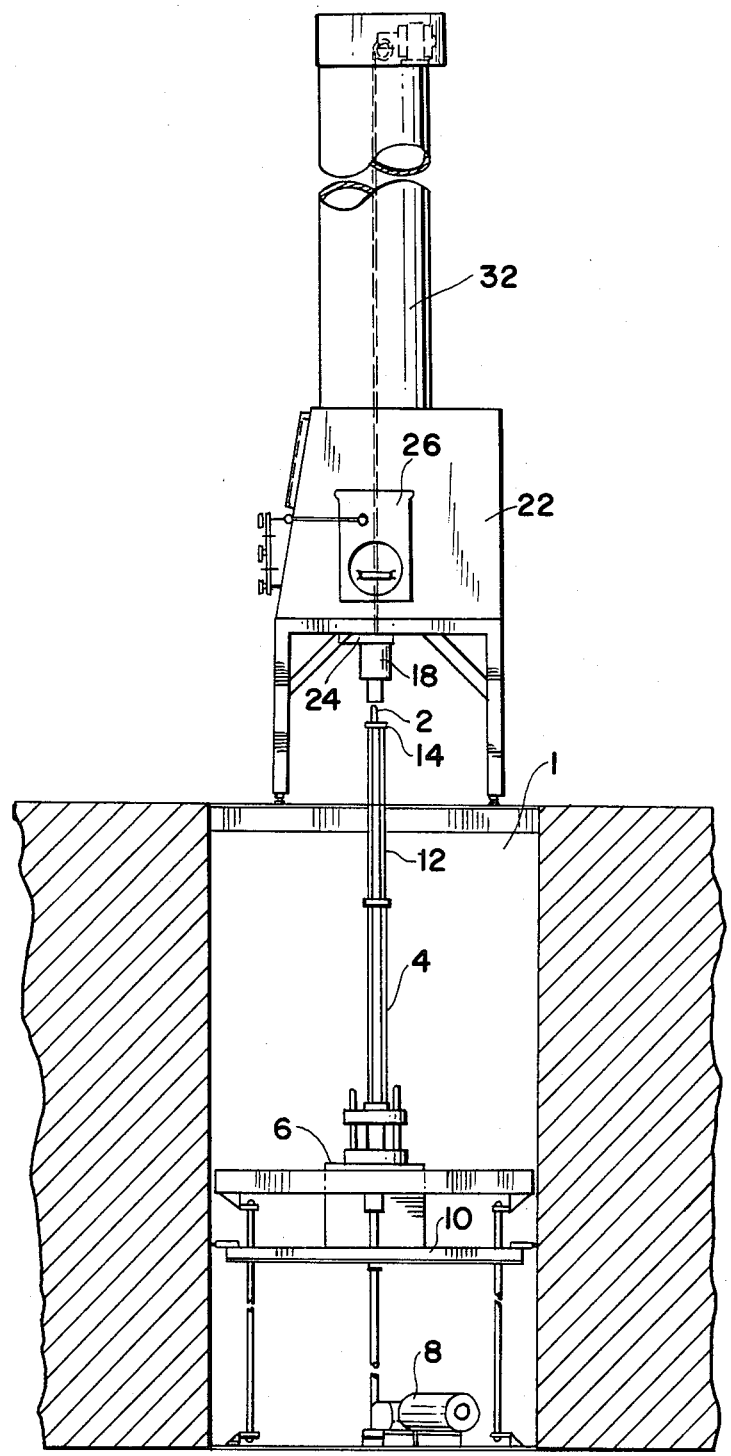
FIG. 3 shows an elevated view of the system viewed from the side.

The present invention is a system and a method for loading nuclear fuel rods with spherical nuclear fuel. The overall system is shown in FIGS. 1 and 3. FIG. 1 shows the system viewed from the front. A fuel cladding rod 2 to be loaded with fuel is held vertically upright by a fuel rod support clamp 4. Because of the length of the fuel rods 2, the rods 2 may be set in pit 1 in the building floor. The support clamp 4 is fixed to a vibrator 6 driven by vibrator motor 8. The vibrator 6 rests on a frame 10. The frame 10 is vertically adjustable to give the vibrator 6 a vertical travel of several feet. This allows the loading system to accomodate fuel cladding rods 2 of different lengths. The support clamp 4 is a cage structure of six vertical rods 12, three of which are held in a spaced parallel array by semi-circular pieces 14 (see FIG. 2). The semi-circular pieces 14 are hinged at one end 16 and clamped 18 at the other. Only one of the bottom semicircular pieces 14 of the support clamp 4 is fixed to the vibrator 6. This allows the half of the support clamp 4 whose bottom semi-circular piece 14 is not fixed to the vibrator 6 to swing open about the hinge 16 disclosing the interior of the clamp. This arrangement allows easy horizontal access to the interior of the fuel rod support clamp 4 in order to insert empty fuel cladding tubes 2 and remove loaded tube 2.

The open upper end of the fuel cladding tube 2 is attached to an adaptor 18 with an airtight connection. The adaptor 18 is mounted to the glove box 22 via a bellows arrangement so that the fuel tube 2 is flexibly mounted to the glove box 22 allowing the fuel tube 2 to vibrate in response to the vibrator 6 while the tube is being locked. The adaptor 18 is connected to the glove box 22 with a vacuum valve 24 so that the adaptor 18 and fuel tube 2 combination may be isolated from the glove box 22 forming an airtight combination.

The glove box 22 is an enclosure capable of being made airtight which receives the nuclear fuel through the entrance vacuum valve 26. The glove box includes windows 28 and hinged glove box covers 30. Opening the glove box covers 30 reveals gloves (not shown) mounted to the glove box 22 which allows the operator to accomplish manipulation within the glove box 22 while still retaining the inert atmosphere within the glove box 22. On the upper side and connected to the glove box 22 is the rod loading assembly cover 32. The rod loading assembly cover 32 is of sufficient length to allow the rod loading assembly 34 to rise high enough so that it is free of the fuel cladding tube 2. FIG. 3 shows a side view of the glove box and fuel cladding tube assembly.

Figure 4:
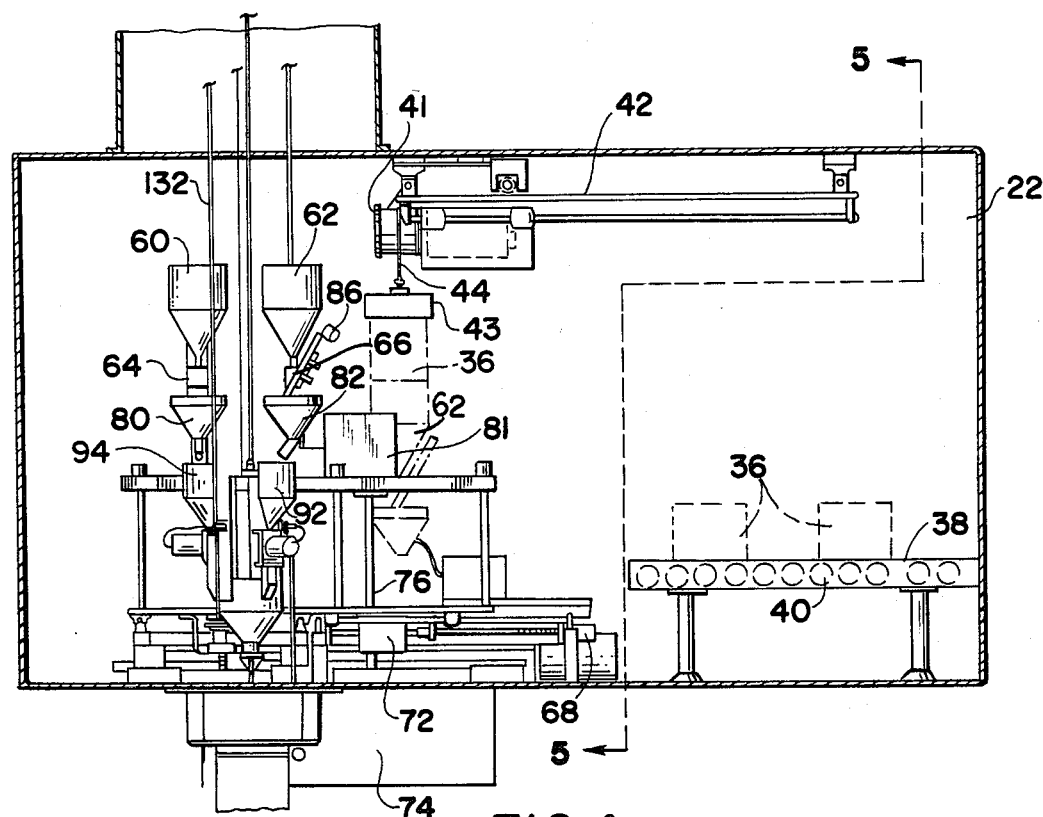
FIG. 4 shows the interior of the glovebox viewed from the front.

After entering the glove box through the vacuum valve 26, the fuel proceeds to the weighing station. Referring to FIGS. 4, 5, 6, and 7 shows the passage of the spherical nuclear fuel from the entrance vacuum valve 26 to the loading hoppers 60 and 62 of the weighing stations. The nuclear fuel spheres enter the glove box 22 through the entrance vacuum valve 26 in containers 36 large enough to hold sufficient fuel for about six fuel tubes 2. The fuel containers 36 indicated by the dotted lines, move along the rollers 40 of the transport conveyer 38, which may be powered or non-powered. After coming to rest on the conveyor 38, the fuel is lifted vertically upward by the overhead transport system 42. The over head transport system 42 is capable of lifting the fuel container 36 from the transport conveyor 38 and moving it from right to left and back and forth within the glove box 22. The overhead transport conveyor 38 includes a rotating drum 41 around which is wrapped a cord 44 for raising and lowering the spheres. The containers 36 are moved one at a time from the transport conveyor 38 to the loading hoppers 60 and 62 of the weighing scales. In the preferred embodiment, three sizes of spheres are used, which are referred to herein as fines, mediums and large. There are three weighing stations, one corresponding to each of the sphere sizes. However, only two of the weighing stations, the fines 64 and mediums 66 are shown for clarity. The mediums weighing station 66 is shown in FIG. 4 by the dotted figure in the load position for receiving fuel. The fuel container 36 is attached to the transport lid 43 and moved by the overhead transport system 42 to each of the weighing stations where the fuel spheres are deposited into the hoppers 60 and 62 of the scales.

Figure 7:
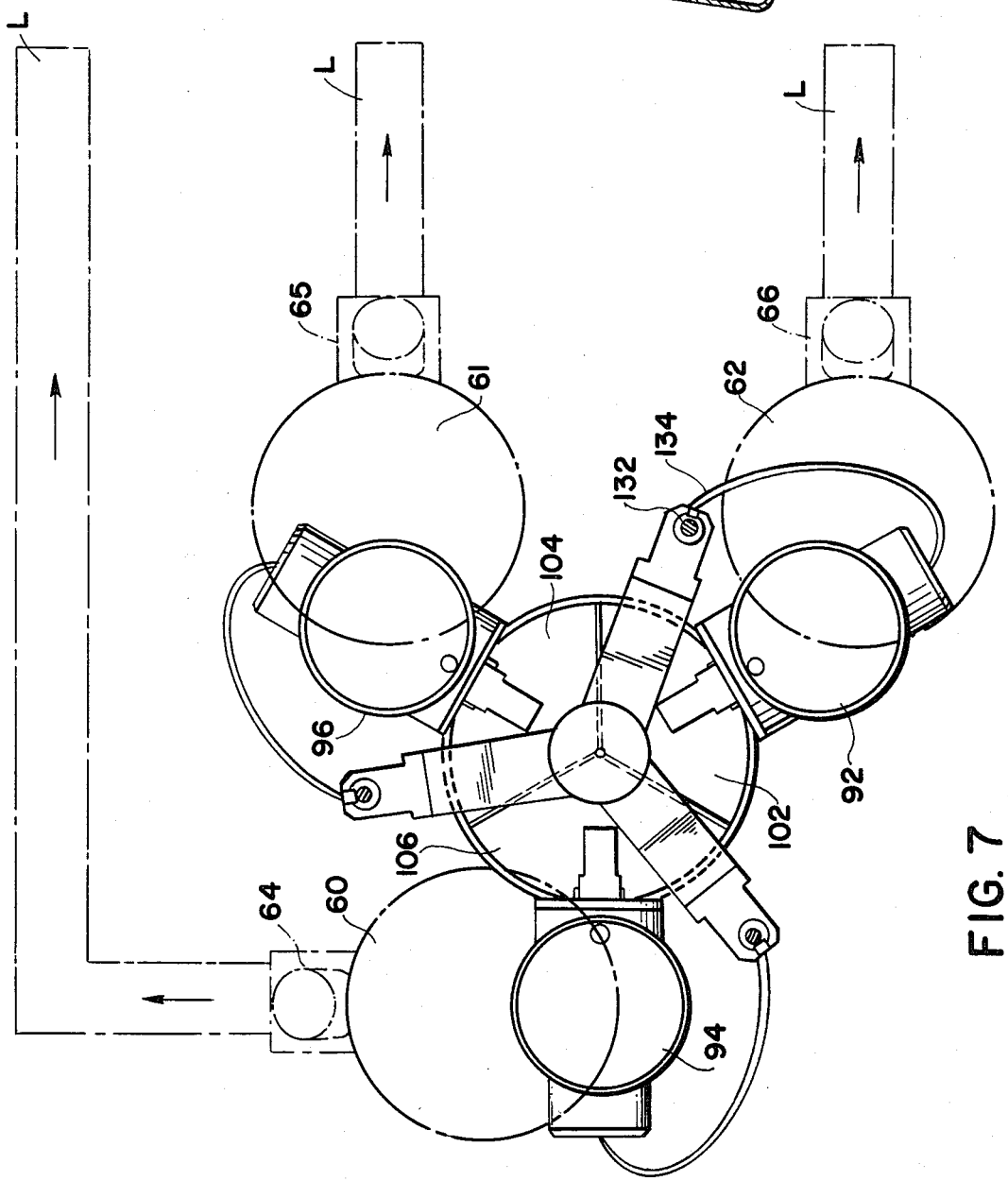
FIG. 7 shows a schematic view of the weighing station system viewed from above.

The mediums 66 and large 65 weighing stations are mounted on one platform and move from side to side by the drive motor 68. In addition, the weighing stations move up and down by the drive mechanism 72, the glove box 22 providing a recess 74 for the support shaft 76 when the station is lowered. The fines weighing station 64 moves front to back driven by the drive motor 78 within the glove box 22 as well as side to side motion driven by motor 70. FIG. 7 shows a schematic view of the weighing station system viewed from above. The relative motion of the weighing stations, fines 64, mediums 66 and large 65 is indicated by arrows. The loading of the weighing station hoppers occurs when the stations are located at the position L of FIG. 7.

As noted above, the mediums 66 and large 65 weighing stations are mounted on one platform and are moved to position L in FIG. 7 for loading. In addition, the weighing stations loading hoppers 61 and 62 are lowered to accommodate the fuel containers 36 which are moved to the weighing stations by the overhead fuel transport 42. The fines weighing system 64 is mounted independently of weighing stations 65 and 66 and moves toward the back of the glove box 22, then to the right and down for loading. The fuel spheres containers 36 are picked up by the overhead transport system 42 and positioned on top of the weighing station hoppers. The spheres are released into the loading hoppers 60, 61 and 62. Spheres of each size are dropped into the weighing scales hoppers 80 and 82 in incremental amounts by the stepper motors 84 and 86. When predetermined amounts of fuel spheres are received by the scale hoppers 80 and 82 as indicated by the weighing means 79 and 81 the flow ceases (recall only two of the three weighing scales are shown in the Figures). These three predetermined amounts of the three sizes of fuel spheres are sufficient to fill one fuel rod 2 when they mixed together within the fuel rod. These fuel spheres are then transferred to the hoppers 92, 94, and 96 of the feeding probe 34.

The feeding probe 34 is described in more detail in copending application Ser. No. 327,816 entitled "Spherical Nuclear Fuel Loading Probe" filed by the same inventor and assigned to same assignee as the present application and incorporated herein by reference. The probe is a means for feeding the three different sizes of spheres into the fuel rod 2 in a controlled manner so that the correct uniform density is achieved in the rod 2. Referring to FIGS. 8, 9 and 10, the probe 34 includes three funnels 92, 94 and 96 into which each of the three quantities of fuel is discharged from the weighing scale hoppers 80, 81 and 82. In FIG. 8, only two 92 and 94 of the three funnels are shown for clarity. The funnels are spaced about 60° apart and are all identical except for the ability to accommodate different sized spherical fuel. The three funnels 92, 94 and 96 are connected to the probe hopper 98 via three solenoid valves 100. There is one solenoid valve 100 for each funnel. The probe hopper 98 is divided into three sections 102, 104 and 106 (see FIG. 7). The fuel spheres, after being released by the solenoid valves 100, pass through a regulator gate 114 shown in FIGS. 8, 9 and 11. The gate 114 is releasably attached by conventional ball plunger means 115 to the hopper 98 so as to restrict the passageway 116 connecting the funnels 92 to the sections 102, 104 and 106 of the probe hopper 98. The gate 114 includes an opening of height h and width w. These dimensions are selected according to the size of nuclear fuel spheres and the desired rate of flow into the probe hopper 98. The rate of flow of each of the fuel spheres is determined so that upon emergence from the probe 34 within the fuel rod 2, the maximum randomness of the three different size spheres is achieved.

The probe hopper 98 is connected to tubing 108, 110 and 112. Each of these tubes corresponds to one of the sections of the probe hopper 98 which, in turn, corresponds to one of the funnels 92, 94 and 96. In the particular embodiment shown in FIG. 8, two of the tubes 108 and 110 are of the same circular cross-section. These tubes are used for the two smallest diameter fuel. The largest fuel sphere is carried by the tube 112 of larger cross section.

The outer surface of lower end 115 of each of the tubes 108, 110 and 112 may be extended into scoops as shown in FIG. 8. The scoop shaped extensions terminate toward the axis through the center of the three tubed arrangement. These extensions help in the mixing of the fuel spheres to provide a random distribution of packing of the fuel tube. To further enhance the randomness of distribution of the three different sized spheres and improve the uniformity of packing of the fuel rod 2, a cone shaped piece 118 may be fixed to the lower end of the fuel tubes 108, 110 and 112 by two cylindrical rod members 130 as shown in FIG. 8. The cone 118 is fixed to the rods 130 by conventional means.

The method for using the above described system is described below. Some of the operations described below are carried by the operator through the glove openings 28. Other operations are carried out automatically e.g., the raising and lowering of the fuel probe 34. The operator places an empty fuel rod 2 in the fuel rod support clamp 4 fixed to the vibrator 6. The upper end of the rod 2 is connected to the adaptor 18 with a flexible coupling to the glove box 22. The feeding probe 34, which is attached to a raising and lowering means 33 by a cable 35 attached to bracket 31 is lowered into the fuel rod 2 so that the tubing 108, 110 and 112 reaches to the bottom of the fuel rod 2.

Figure 5:
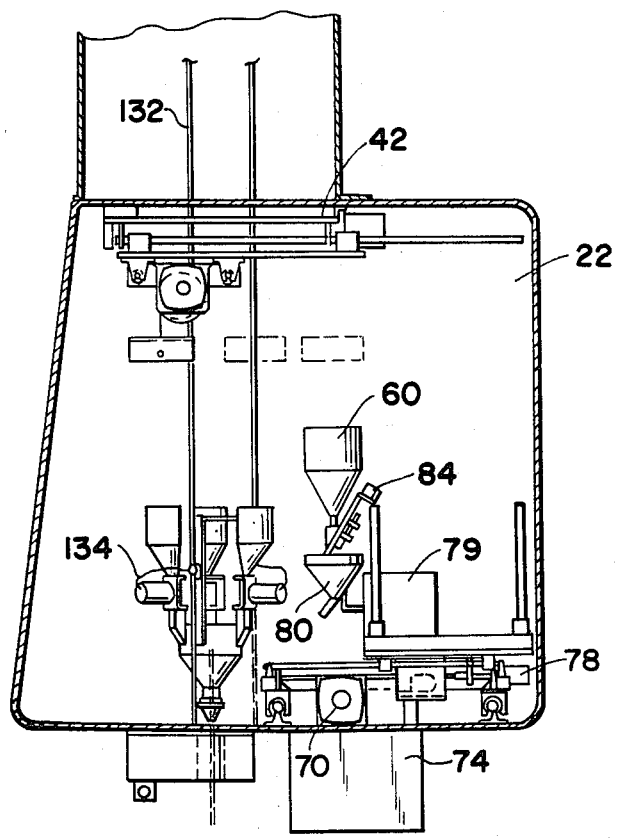
FIG. 5 shows the interior of the glovebox viewed from the side with the fines weighing station in the load position.
Figure 6:
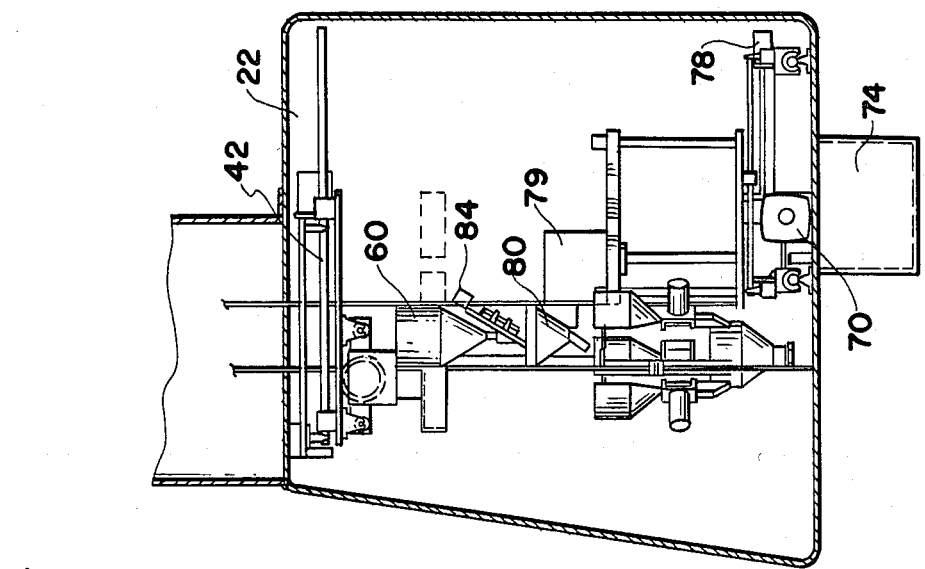
FIG. 6 shows the interior of the glovebox viewed from the side with the fines weighing station in the dump position.

The operator then transfers the fuel sphere container 36 from the transport conveyer 40 to the loading position L (See FIG. 7) by the overhead transport system 42. At position L, the fuel spheres are transferred to the hoppers 60, 61 and 62 of the weighing scales. Predetermined amounts of fuel are released to the weighing station hoppers 80 and 82 by the stepper motors 84 and 86. The weighing stations are then moved into the dump position relative to the feed probe 34 so that the fuel spheres may be unloaded into the feeding probe hoppers. FIG. 4 shows the medium weighing station 66 in the loading position as indicated by the dotted outline. After loading the fuel into hopper 62, the weighing station is raised and moved into position as indicated by the solid figure to unload the fuel spheres into the fuel probe. FIGS. 5 and 6 show the fines weighing station 64 in the load position and the dump position, respectively.

The weighing stations are moved out of the way of the fuel feeding probe 34 and the solenoid valves 100 are opened. The fuel spheres descend through the valve 100, the regulator gate 114 and the tubing 108, 110 and 112. As the fuel reaches the bottom of the fuel rod 2, the probe 34 is raised at a rate so that the bottom of the fuel probe 34 remains just above the ascending fuel column. That is, the spheres are deposited on top of the fuel column such that the end of the probe remains between about 1 and 5 in above the ascending fuel column. Copper tubes 132 guide the feeding probe 34 up and down. The copper tubes 132 in combination with wires 134 provide the electrical contact to operate the solenoids 100.

The vibrator 6 is in operation while the fuel rod 2 is being loaded to assist in the packing of the fuel rod 2. After the loading is completed and feeding probe 90 is clear of the fuel rod 2, the rod is removed from the support clamp 4. A new fuel rod is placed in the clamp 4 and process is started again.

I claim:

1. A system for the loading of substantially spherical nuclear fuel into a vertically maintained fuel rod comprising:
   (a) a main house having an inert atmosphere and having a sealable opening to receive three quantities of fuel spheres, each quantity having a different diameter for loading into fuel rods, said fuel rods having one open end within said housing;
   (b) a weighing station system for receiving said spheres and separating each of said three quantities of spheres into predetermined quantities, said weighing station including a balance means for weighing said nuclear fuel spheres;
   (c) a means for transferring said fuel spheres after entering said main housing to said weighing station within said main housing;
   (d) a fuel rod support system for supporting said fuel rod in an upright position;
   (e) a means for feeding said predetermined quantities of said fuel spheres in a controlled manner into said fuel rod so as to randomly mix said fuel spheres;
   (f) a means for raising and lowering said feeding means,
   (g) a means for transferring each of said predetermined quantities of said fuel spheres to a corresponding hopper of said feeding means for subsequent loading into said fuel rod;
   (h) a means for maintaining said fuel rod in sealing engagement with said main housing in order to preserve said inert atmosphere.

2. The system of claim 1 wherein said means for transferring said fuel spheres from said housing opening to said weighing stations includes an overhead transport system able to move said fuel from said housing opening to said weighing stations.

3. The system of claim 2 wherein said transferring means from said weighing stations to said feeding means includes movable platforms on which are mounted said weighing stations.

4. The system of claim 3 wherein said movable platforms allow said weighing scales to move in the horizontal and vertical directions.

5. The system of claim 4 wherein said each weighing station means includes:
   (a) a hopper for receiving said fuel spheres
   (b) a weighing hopper;
   (c) means for transferring said fuel to said weighing hopper in incremental amounts;
   (d) means for weighing said fuel in said weighing hopper;
   (e) means for terminating the flow of said fuel to said weighing hopper when said weighing scale receives a predetermined amount.

6. The system of claim 1 wherein said feeding means includes an elongated feeding probe having a length at least substantially as great as said fuel rod and open upper and lower ends, and said lowering means lowers said probe into said fuel rod so that the bottom of said probe is near the bottom of said fuel rod and raises said probe at a predetermined rate.

7. The system of claim 1 further comprising a means for vibrating said fuel rod while maintaining said fuel rod in sealing engagement with said housing.

8. The system of claim 1 further comprising guide means for directing said feeding means into said fuel rod.

9. A method for loading a nuclear fuel rod with comprising:
   (a) connecting a fuel rod to a glove box having an inert atmosphere;
   (b) transferring nuclear fuel spheres having three different diameters into said glove box;
   (c) transferring said fuel spheres to weighing stations within said glove box, a different weighing station corresponding to each diameter of said nuclear fuel spheres;
   (d) weighing out a predetermined quantity of fuel spheres for each diameter;
   (e) lowering a fuel probe into said fuel rod so that the lower end of said probe is just above the bottom of said fuel rod;
   (f) transferring said fuel spheres to hoppers on said fuel probe, one hopper corresponding to each of said diameters of said nuclear fuel sphere;
   (g) discharging said nuclear fuel spheres from said lower end of said fuel probe at a controlled rate into said fuel rod;
   (h) removing said fuel probe from said fuel rod at a rate such that said lower end of said fuel probe remains just above the top of the ascending fuel column.

* * * * *